US006868102B2

(12) United States Patent
Brindel

(10) Patent No.: US 6,868,102 B2
(45) Date of Patent: Mar. 15, 2005

(54) CS-RZ OPTICAL CLOCK SIGNAL GENERATOR, AND A RESYNCHRONIZED OPTICAL MULTIPLEXER CONTAINING SUCH A GENERATOR

(75) Inventor: Patrick Brindel, Longpont S/Orge (FR)

(73) Assignee: Alcatel, Paris (FR)

( * ) Notice: Subject to any disclaimer, the term of this patent is extended or adjusted under 35 U.S.C. 154(b) by 5 days.

(21) Appl. No.: 10/244,481

(22) Filed: Sep. 17, 2002

(65) Prior Publication Data

US 2003/0058495 A1 Mar. 27, 2003

(30) Foreign Application Priority Data

Sep. 27, 2001 (EP) ............................................ 01440315

(51) Int. Cl.[7] .................................................. H01S 3/13
(52) U.S. Cl. .............................. 372/32; 372/20; 372/28; 385/24
(58) Field of Search ........................ 372/32, 20; 385/24, 385/11, 15

(56) References Cited

U.S. PATENT DOCUMENTS

| 4,468,766 | A |   | 8/1984  | Spezio |
| 4,552,457 | A | * | 11/1985 | Giallorenzi et al. ........ 356/477 |
| 5,687,261 | A | * | 11/1997 | Logan ......................... 385/24 |
| 6,529,279 | B2 | * | 3/2003 | de Groot et al. ............. 356/517 |
| 2001/0014106 | A1 | * | 8/2001 | Gevorgian et al. ............ 372/20 |

FOREIGN PATENT DOCUMENTS

| EP | 2 307 332 A | 5/1997 |
| EP | 1059758 A2 | 12/2000 |
| GB | 2 323 467 A | 9/1998 |
| WO | WO 9719504 | 5/1997 |
| WO | WO 97/19504 A1 | 5/1997 |

OTHER PUBLICATIONS

Y. Miyamoto et al, "320 Gbit/s (8×40 Gbit/s) WDM transmission over 367 km with 120 km repeater spacing using carrier–suppressed return–to–zero format", Electronics Letters, Nov. 11, 1999, vol. 35, No. 23, pp. 2041–2042.

A. Hirano et al, "40 Gbit/s L–band transmission experiment using SPM–tolerant carrier–suppressed RZ format", Electronics Letters, Dec. 9, 199, vol. 35, No. 25, pp. 2213–2215.

* cited by examiner

Primary Examiner—Minsun Oh Harvey
Assistant Examiner—Dung Nguyen
(74) Attorney, Agent, or Firm—Sughrue Mion, PLLC

(57) ABSTRACT

The present invention provides a generator of a CS-RZ optical clock signal at a predetermined clock frequency. The generator contains a first laser source and a second laser source which respectively produce first and second continuous lightwaves, where the laser frequency of at least one of the sources is adjustable. The generator also contains a coupler disposed to receive the first and second lightwaves and forms optical beats at a beat frequency. An optoelectronic feedback is used to servo-control the adjustable-frequency laser source(s) in such a manner that the beat frequency, which is equal to the difference between the laser frequencies, is substantially equal to the clock frequency.

8 Claims, 3 Drawing Sheets

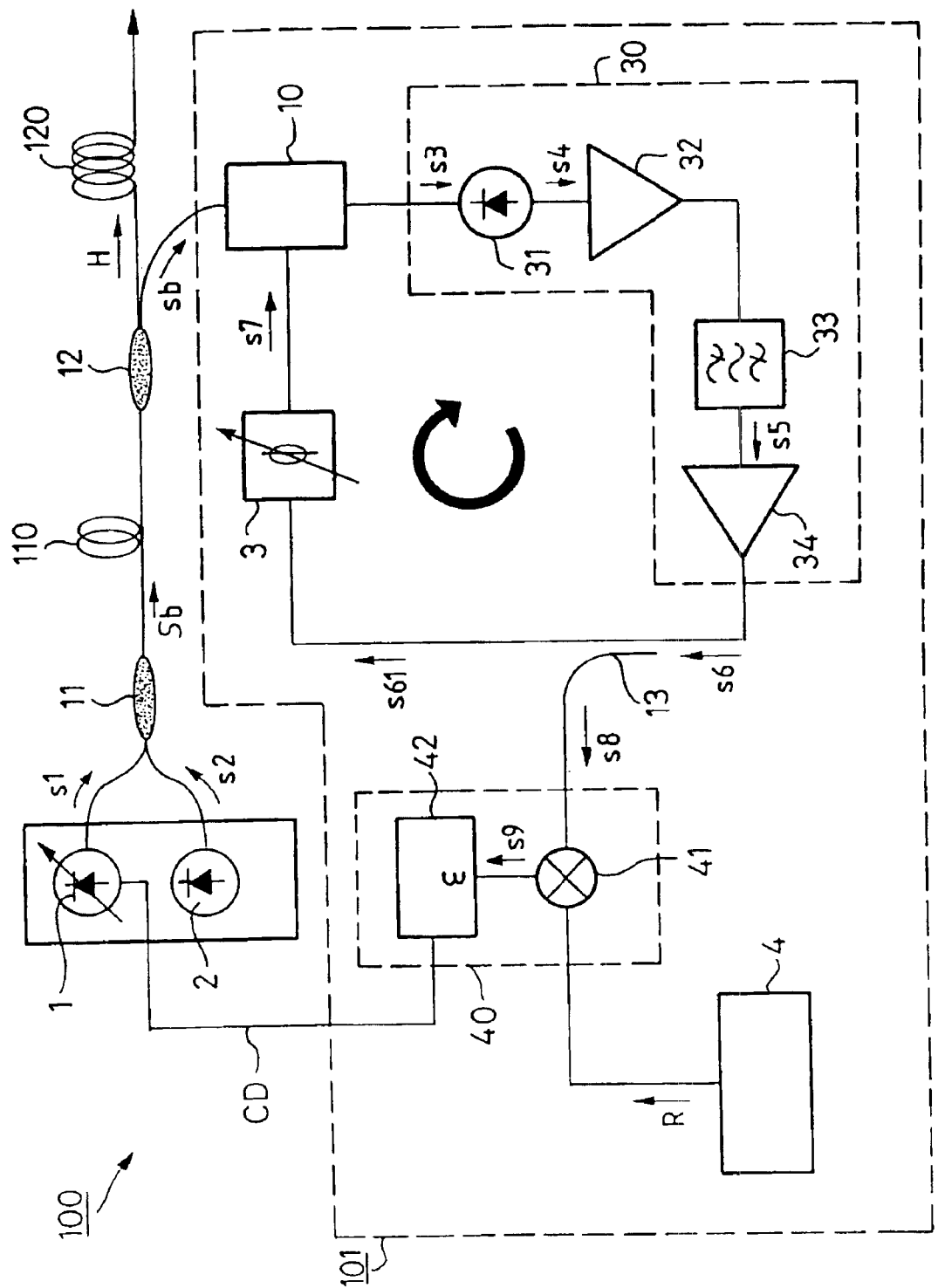
FIG_1

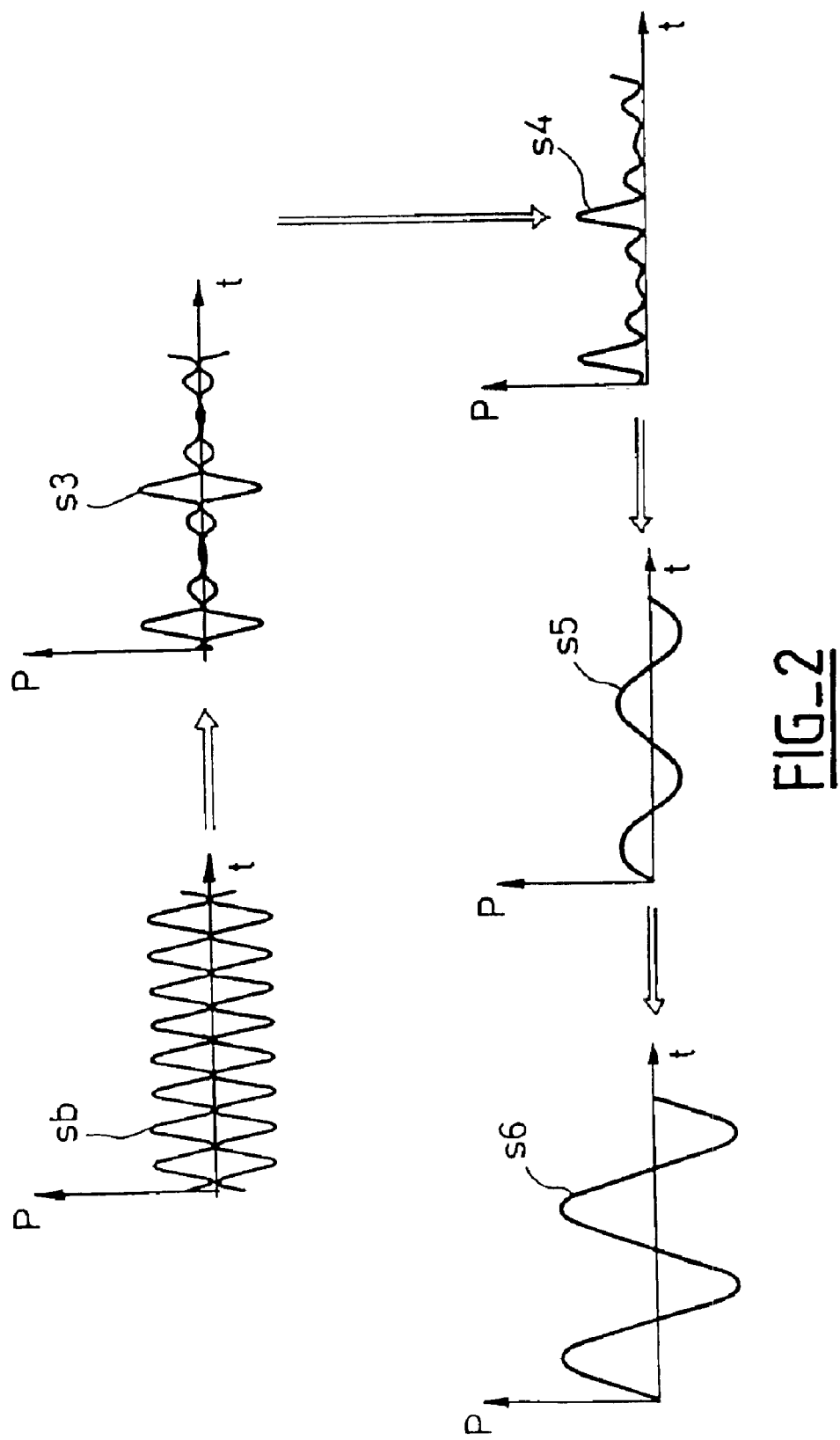
FIG_2

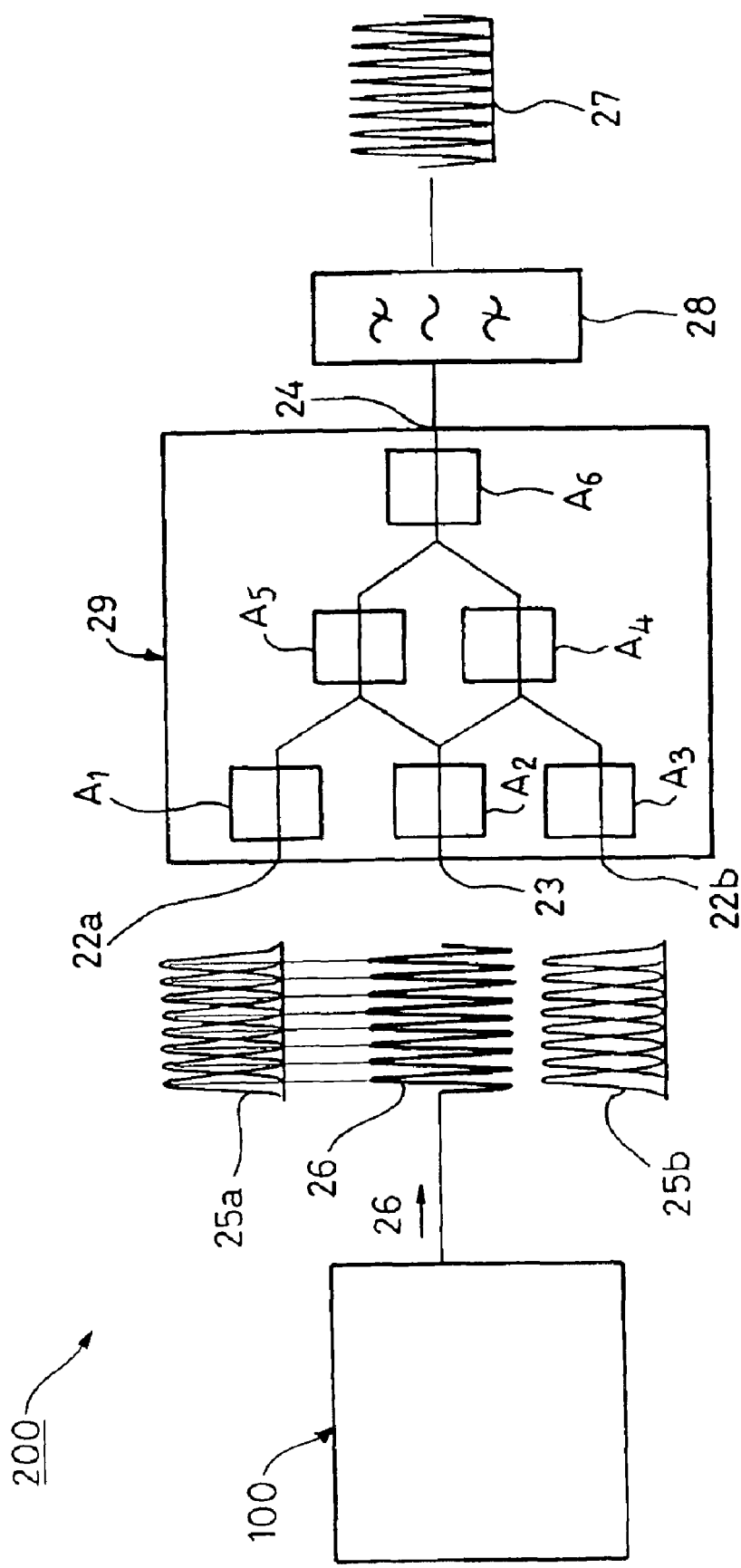
FIG_3

CS-RZ OPTICAL CLOCK SIGNAL GENERATOR, AND A RESYNCHRONIZED OPTICAL MULTIPLEXER CONTAINING SUCH A GENERATOR

BACKGROUND OF THE INVENTION

The invention is based on a priority application EP 01 440 315.8 which is hereby incorporated by reference.

The present invention relates to a CS-RZ optical clock signal generator having a high clock frequency, and to any optical device incorporating such a generator, such as a resynchronized optical multiplexer, for example. The invention applies in particular to optical transmission systems operating at very high bit rates.

In conventional manner, the power spectrum density of a return-to-zero (RZ) optical signal is relatively broad because of the large number of transitions in the signal to be transmitted. Because the transmitted energy is thus spread over a wide range of frequencies, an RZ signal is sensitive to group velocity dispersion (GVD) i.e. to chromatic dispersion, and also to four-wave mixing (FWM) or "crosstalk" in wavelength multiplexed systems. Nevertheless, RZ format presents the advantage of being little affected by self-phase modulation (SPM) comparatively to a non-return-to-zero (NRZ) format. It often happens that the SPM induced by optical non-linearities in a line fiber gives rise to optical signal distortion that reduces the range and the capacity of optical transmission systems. In addition, RZ signals are suitable for being regenerated by synchronous modulation.

Conversely, the power spectrum density of a NRZ optical signal is narrower than that of an RZ signal. However, in NRZ format, both capacity and transmission range are limited by SPM. Furthermore, there are no optical or electronic regenerators in existence that are capable of processing such signals at high bit rates. In addition, the means for receiving such signals are unsuitable for integration and often introduce losses because of the interaction between successive "0" and "1" bits, and/or distortion, so that the extinction ratio of the signal after electrical filtering is degraded.

There also exist carrier-suppressed return-to-zero (CS-RZ) optical signals having the feature of presenting bits that are always phase-shifted by 180° relative to adjacent bits.

CS-RZ signals possess numerous advantages over conventional signals, both RZ and NRZ.

In the article entitled "320 Gbit/s (8⊠40 Gbit/s) WDM transmission over 367 km with 120 km repeater spacing using carrier-suppressed return-to-zero format", published in Elec. Letters, Vol. 35, No. 31, Nov. 11, 1999, Y. Miyamoto et al. disclose experiments performed on a wavelength division multiplex (WDM) transmission line in which CS-RZ optical signals were transmitted over eight channels at 40 gibabits per second (Gbit/s). The transmission line used comprised both monomode fibers and fibers with inverse dispersion so as to obtain zero mean total dispersion. The experiments showed firstly that CS-RZ signals are tolerant of optical non-linearities. They also showed that CS-RZ signals at 40 Gbit/s provide a power level per transmission channel that is greater than that of a conventional RZ signal and that they present a power of spectrum density per channel that is narrower than that of conventional RZ signals at 40 Gbit/s, allowing WDM channels to be closer to each other.

Signals with such spectrum efficiency making it possible to occupy transmission bands more densely and/or to increase per-channel capacity are thus advantageous for future dense wavelength division multiplexing (DWDM) systems having total desired capacity in excess of petabits per second (Pbit/s).

Furthermore, in another article entitled "40 Gbit/s L-band transmission experiment using SBP-tolerant carrier-suppressed RZ format", published in Elec. Letters, Vol. 35, No. 25, Dec. 9, 1999, A. Hirano et al. describe using a shifted dispersion optical fiber link in particular to compare the optimum dispersion stabilities of RZ, CS-RZ, and NRZ signals in the large (L) transmission band at frequencies in the range 1570 nanometers (nm) to 1605 nm, and they conducted their experiment up to high injected optical power levels. From those articles, it appears that CS-RZ signals at 40 Gbit/s present the most stable optimum dispersion and remain the closest to a total dispersion in the vicinity of 0 picosecond per nanometer (ps/nm). Dispersion tolerance is explained in particular by the phase inversion between adjacent bits which eliminates all inter-bit interference. Furthermore, CS-RZ signals subject the sensitivity of the receiver to little degradation at high power. Those results also confirm that CS-RZ signals are less sensitive to SPM than are NRZ signals.

In the second article, the generator producing the CS-RZ optical signals at 40 Gbit/s comprise a Mach-Zehnder modulator in push-pull mode fed with a sinusoidal electrical signal at a frequency of 20 gigahertz (GHz) and operating at the zero bias point for its transfer function.

Another type of CS-RZ clock signal generator is based on using a phase modulator to change the phase of each successive bit.

Because of their limited passbands, those prior art generators do not make it possible, at present, to produce stable CS-RZ signals at a modulation frequency in excess of 40 Gbit/s. In other words, such generators are unsuitable for producing CS-RZ signals at very high bit rates.

SUMMARY OF THE INVENTION

Thus, an object of the present invention is to provide a CS-RZ optical clock signal generator that is stable at very high frequency.

To this end, the invention provides a generator of a CS-RZ optical clock signal at a predetermined clock frequency, the generator comprising:
  a first laser source and a second laser source respectively producing first and second continuous lightwaves, the laser frequency of at least one of said sources being adjustable;
  coupling means disposed to receive the first and second lightwaves and suitable for forming optical beats at a beat frequency; and
  an opto-electronic feedback to servo-control the adjustable-frequency laser source(s) in such a manner that the beat frequency which is equal to the difference between the laser frequencies is substantially equal to the clock frequency.

This generator of the invention is based merely on using two laser sources operating under continuous wave (CW) conditions and under servo-control. This differs from the prior art, which generally makes use of an electrical radiofrequency (RF) synthesizer. Because of the feedback loop, the generator of the invention makes it possible to obtain signals of the same quality, i.e. having the same regularity, as signals produced using such an RF synthesizer.

By construction, the optical beats in accordance with the invention have a sinusoidal envelope modulated at the desired clock frequency. As a result, there is no carrier, i.e. no energy is transported at a "carrier" frequency which is equal to the average of the laser frequencies. In addition, the successive phases of the envelope can be understood as alternately encoding a phase of 0 and a phase of p. The generator of the invention thus provides an optical CS-RZ signal clock at very high frequency.

The generator is thus well adapted and easy to being integrated in future generations of very high bit rate optical transmission and communication systems.

In a preferred embodiment of the invention, the opto-electronic feedback loop comprises:

optical processing means placed to receive a optical signal representative of said beat and suitable for forming a modified optical signal;

converter means placed to receive said modified optical signal and suitable for forming a measurement electrical signal at a frequency substantially equal to the beat frequency divided by an integer greater than 1; and comparator means giving the difference between the frequency of a comparison electrical signal representing the measurement electrical signal and a reference frequency equal to said clock frequency divided by said integer, said comparator means including a control device for adjusting the laser frequency(ies) in response to said difference.

By way of example, the reference frequency is that of a reference electrical signal produced by an RF oscillator. For example, to produce a clock at 160 GHz, an RF oscillator at 40 GHz is selected, for example, providing an operating frequency for the feedback loop that is well below the clock frequency achieved.

The converter means of the invention for converting the modified optical signal into a measurement electrical signal can comprise a photodetector of passband equal to the reference frequency.

Preferably, the converter means of the invention can include a bandpass electrical filter placed after said photodetector and centered on a filter frequency equal to the reference frequency.

Furthermore, the opto-electronic feedback loop of the invention can include a variable electrical phase shifter arranged to receive a fraction of the measurement electrical signal and suitable for forming a phase-shifted electrical signal.

Advantageously, the processing means of the invention can comprise an electro-absorption modulator (EAM) placed to receive the phase-shifted electrical signal and the representative optical signal and suitable for forming said modified optical signal.

For example, if the representative optical signal presents a frequency equal to the beat frequency, the modified optical signal is modulated in such a manner that its frequency is substantially equal to the beat frequency divided by an integer greater than 1.

Furthermore, the opto-electronic feedback loop can include at least one electrical amplifier.

The generator of the invention can comprise sampling means placed to receive the optical beat and suitable for forming a representative optical signal at a frequency equal to the beat frequency.

Furthermore, to achieve high bit rates at a single wavelength for long distance transmission by optical fiber, one possible approach is optical time division multiplexing (OTDM) which combines N trains of coded pulses having distinct carriers and the same initial bit rate to produce a single train of encoded pulses at a rate that is N times greater than the initial rate.

Advantageously, retimed ODTMs (ROTDMs) possess an additional function of resynchronization by means of an optical clock.

Thus, the present invention also provides a resynchronized optical multiplexer containing an optical signal generator as described above.

The multiplexer of the invention thus operates at a very high bit rate.

BRIEF DESCRIPTION OF THE DRAWINGS

The characteristics and objects of the present invention appear more clearly from the following detailed description given with reference to the accompanying FIG. that are purely illustrative and not limiting in any way.

In the Figures:

FIG. 1 is a block diagram of a CS-RZ optical clock signal generator of the invention in a preferred embodiment;

FIG. 2 is a set of diagrams showing how a signal varies around a feedback loop included in the generator of FIG. 1; and FIG. 3 shows an example of a resynchronized optical multiplexer containing the FIG. 1 optical signal generator.

FIG. 1 is a block diagram of a CS-RZ optical clock signal generator 100 constituting a preferred embodiment.

The generator 100 produces a CS-RZ optical clock signal H at a predetermined clock frequency, e.g. equal to 160 GHz.

The generator 100 comprises firstly a first laser source 1 and a second laser source 2 respectively producing a first continuous lightwave s1 and a second continuous lightwave s2. The first laser frequency of the first laser source 1 is adjustable, and by way of example it is about 200 terahertz (THz) i.e. in the usual range for transmission frequencies.

Thereafter, coupling means such as an optical Y coupler 11 (a directional coupler having inlet branches in a Y-configuration) receives the first and second lightwaves s1 and s2 and combines the first and second waves s1 and s2 to deliver optical beats Sb at a beat frequency fb that is initially equal to about 160 GHz.

The optical beat Sb is carried by a transmission line such as an optical fiber 110 placed downstream from the coupler 11.

Sampling means such as a Y coupler 12 having two outlet branches in a Y-configuration receive the optical beat Sb. The first outlet delivers the clock signal H which is transmitted over another optical fiber 120. The second outlet is coupled to an opto-electronic feedback loop 101 and delivers a representative optical signal sb representing the beat Sb.

The loop 101 includes optical processing means 10 constituted by an EAM which receives, in particular, the representative optical signal sb and delivers a modified optical signal s3 which is then injected into converter means 30. The converter means 30 deliver a measurement electrical signal s6 to a microwave coupler 13 whose first output delivers an electrical signal s61 to a variable phase shifter 3 which delivers a phase-shifted electrical signal s7 that is fed to the EAM 10. The second output delivers a comparison electrical signal s8 which is injected into comparator means 40.

The comparator means 40 compare the signal s8 with a reference electrical signal R produced by a microwave oscillator 4 at a reference frequency equal to the clock frequency divided by an integer. By way of example, a reference frequency is selected which is equal to 40 GHz. The means 40 supply a control electrical signal CD serving to adjust the first laser frequency in response to said comparison.

In the example shown, the converter means 30 comprise:
- a photodetector 31, e.g. a photodiode having a passband equal to the reference frequency, i.e. 40 GHz and delivering an electrical signal s4;
- an electrical low-noise amplifier (LNA) 32;
- an electrical bandpass filter 33 centered on a filter frequency equal to the reference frequency, i.e. 40 GHz, and delivering a filtered electrical signal s5; and
- another amplifier 34 delivering the measurement electrical signal s6.

The elements 31, 32, 33, and 34 are connected in that order between the processing means 10 and the phase shifter 3.

In the example shown, the comparator means 40 are constituted by a mixer 41 mixing the signals R and s8. The mixed signal s9 is injected into a control device 42 which serves to adjust the first laser frequency.

The loop 101 thus serves to servo-control the first laser source 1 of adjustable first laser frequency in such a manner that the beat frequency is equal to the difference between the laser frequencies and is substantially equal to the clock frequency.

The operation of the loop 101 is described below with reference to FIG. 1 and with reference to FIG. 2 which is a set of diagrams showing how the appearance of a signal varies around the feedback loop 101. In the diagram, time t is plotted along the abscissa and power P is plotted up the ordinate.

The EAM 10 receives the optical signal sb at the beat frequency fb. The EAM delivers the optical signal s3 which is amplitude-modulated and thus presents a frequency that is substantially equal to fb/4, i.e. about 40 GHz.

The photodetector 31 then transforms the optical signal s3 into an electrical signal s4 having the same frequency fb/4. Thereafter, after amplification, the electrical signal passes through the filter 33 which supplies a filtered electrical signal s5 having the same electrical frequency fb/4 and a waveform that is sinusoidal. The signal s5 is amplified by the amplifier 34 which supplies the coupler 13 with a measurement electrical signal s6 at a frequency fb/4 that is approximately equal to 40 GHz.

In addition, the variable phase shifter 3 is adjusted so that the phase of the signal s7 supplied to the modulator 10 makes it possible to obtain the desired signal s3 at the outlet from the modulator 10.

The comparison electrical signal s8 is of sinusoidal waveform at the frequency fb/4 which is substantially equal to 40 GHz. The mixed signal s9 serves to provide the difference between the reference signal set at 40 GHz and the frequency fb/4. Since the signal s8 stems from the optical beat Sb, the frequency difference is indicative of the adjustment that needs to be performed on the adjustable first loser frequency in order to obtain beats Sb and thus a clock signal H at a frequency equal to 160 GHz.

Furthermore, the resulting clock signal H has a sinusoidal envelope modulated at 160 GHz (see FIG. 2). As a result, there is no carrier, i.e. no energy is transported at a "carried" frequency equal to the average of the laser frequencies. In addition, the successive phases of the envelope H alternate between encoding a phase of 0 and a phase of p.

The generator 100 thus provides CS-RZ optical clock signals at very high frequency.

To obtain an ultrastable generator, the absolute error that can be tolerated on the beat frequency is about 100 kilohertz (kHz) which represents a relative error of about $5 \times 10^{-10}$.

FIG. 3 is a diagram of an embodiment of a resynchronized optical time domain multiplexer 200 including the CS-RZ optical clock signal generator of the invention. Such an optical multiplexer 200 acts as a wavelength converter.

The multiplexer 200 has two optical data accesses 22a, 22b and an optical probe access 23 (there could be more than two data accesses in other i;embodiments). Two CS-RZ optical data signals 25a, 25b, each made up of a multi-wavelength data stream comprising N different, previously-interleaved channels (in this example N=4) are applied to said optical data accesses 22a and 22b. These wavelength channels may well be selected from the International Telecommunications Union (ITU) recommendations and they may be close together if not contiguous. Each of these channels operates at a bit rate of fh/N where fh is the frequency of a CS-RZ optical clock signal 26 at a wavelength $l_m$ produced by a generator 100 of the invention. The optical clock signal 26 is provided in such a manner as to be synchronous with said optical data signals 25a and 25b.

In the multiplexer 200, the initial optical clock signal 6 is converted to provide a time domain multiplexed CS-RZ signal 27 on an optical outlet 24 at a bit rate fh and at the same wavelength $I_m$. The optical multiplexer 200 can be implemented as an interferometer type Mach-Zehnder semiconductor optical amplifier (SOA) 29 comprising six semiconductor optical amplifiers $A_1, \ldots, A_6$. Alternately, it would also be possible to use a non-linear optical loop mirror (NOLM). This is to take advantage of the gain conversion property of said multiplexer 200.

By way of example, if the four passively-interleaved channels at 40 GHz are applied to the optical data access as a multi-wavelength data stream they will be converted into a single 160 Gbit/s data stream within said optical multiplexer 200. The new carrier wavelength is that of the optical clock signal $I_m$ (probe access). A filter 28 is placed downstream from the optical data outlet 24 of the optical multiplexer 200 to eliminate any remaining contribution from the initial multi-wavelength data streams. The filter 28 is centered on $I_m$, and passes only the converted optical time domain multiplexed CS-RZ signal 27.

Naturally, the above description is given purely by way of illustration. Without going beyond the ambit of the invention, any means can be replaced by any equivalent means.

The clock frequency can be other than 160 GHz and should be selected as a function of a particular application.

It is equally possible for the reference frequency to be equal to the clock frequency divided by a non-zero integer other than four.

The invention also applies to any other optical device that requires a clock to be recovered.

Using the invention, it is easy to implement an electro-optical multiplier by replacing the electrical reference signal with an input electrical signal at a given frequency which is to be converted into an optical signal at a higher frequency.

What is claimed is:

1. A generator of a CS-RZ optical clock signal at a predetermined clock frequency, the generator comprising:
    a first laser source and a second laser source respectively producing first and second continuous lightwaves, the laser frequency of at least one of said sources being adjustable;
    coupling means disposed to receive the first and second lightwaves and suitable for forming optical beats at a beat frequency; and an opto-electronic feedback to servo-control the adjustable-frequency laser source(s) in such a manner that the beat frequency which is equal to the difference between the laser frequencies is substantially equal to the clock frequency; wherein the opto-electronic feedback loop comprises:

optical processing means placed to receive an optical signal representative of said beat and suitable for forming a modified optical signal;

converter means placed to receive said modified optical signal and suitable for forming a measurement electrical signal at a frequency substantially equal to the beat frequency divided by an integer greater than 1; and comparator means giving the difference between the frequency of a comparison electrical signal representing the measurement electrical signal and a reference frequency equal to said clock frequency divided by said integer, said comparator means including a control device for adjusting the laser frequency(ies) in response to said difference.

2. An optical signal generator according to claim 1, wherein the converter means comprises a photodetector having a passband equal to said reference frequency.

3. An optical signal generator according to claim 1, wherein the converter means include an electrical bandpass filter centered on a filter frequency equal to said reference frequency.

4. An optical signal generator according to claim 1, wherein the opto-electronic feedback loop includes a variable electrical phase shifter placed to receive a fraction of the measurement electrical signal and suitable for delivering a phase-shifted electrical signal.

5. An optical signal generator according to claim 4, wherein the processing means comprise an EAM placed to receive the phase-shifted electrical signal and the representative optical signal and suitable for forming the modified optical signal.

6. An optical signal generator according to claim 1, wherein said converter means comprise at least one electrical amplifier.

7. An optical signal generator according to claim 1, wherein it includes sampling means placed to receive the optical beats and suitable for forming an optical signal representative of the beats at a frequency equal to the beat frequency.

8. A resynchronized optical multiplexer containing an optical signal generator according to claim 1.

* * * * *